Patented Dec. 13, 1927.

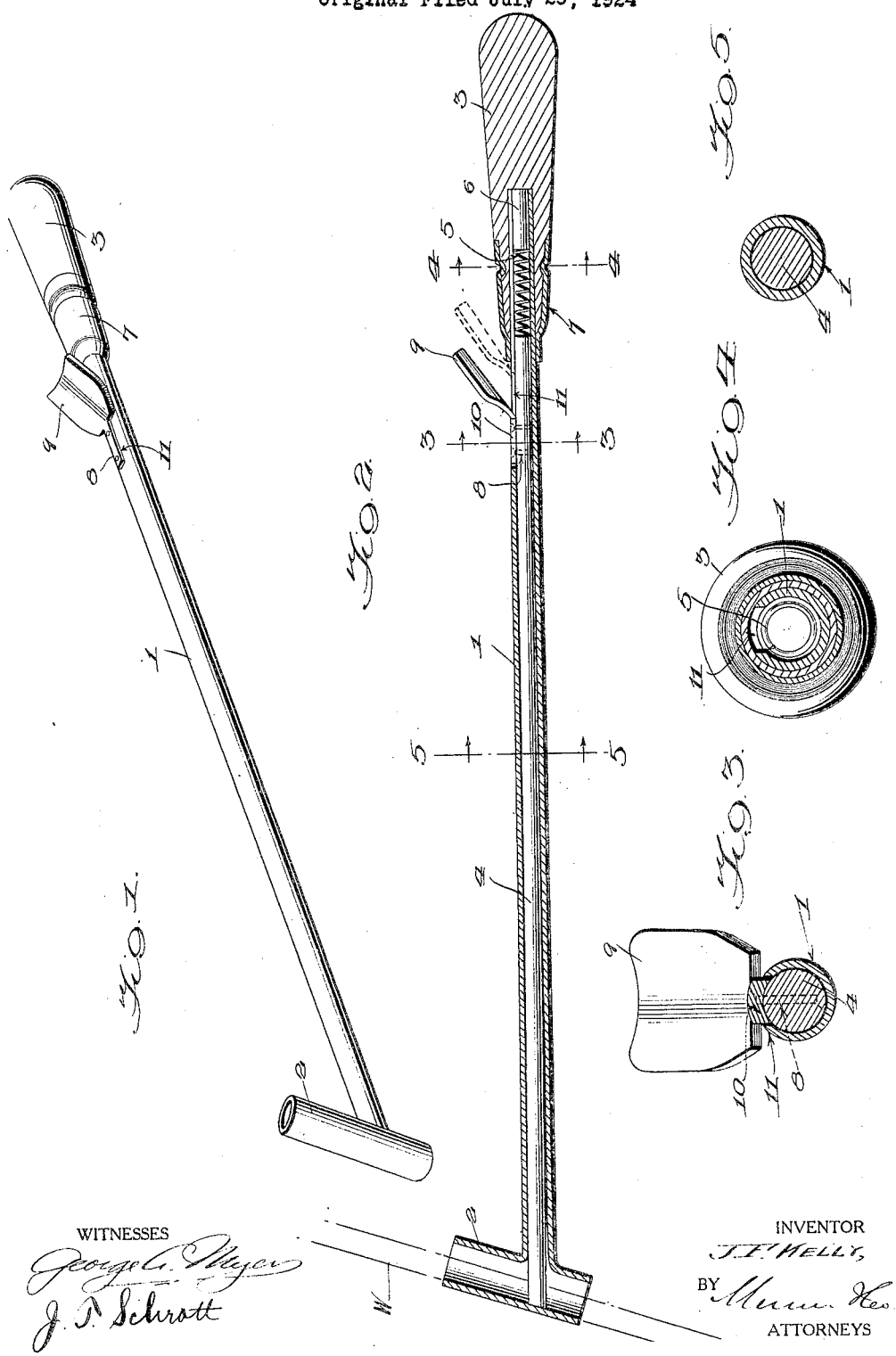

UNITED STATES PATENT OFFICE.

JOHN F. KELLY, OF ELKINS, WEST VIRGINIA, ASSIGNOR OF ONE-HALF TO WILLIAM KELLY, OF ELKINS, WEST VIRGINIA.

WELDING-ROD HOLDER.

Application filed July 29, 1924, Serial No. 728,940. Renewed May 11, 1927.

This invention is an improvement in means for holding the stock during the operation of welding, and it consists of the constructions, combinations and arrangements herein described and claimed.

An object of the invention is to provide a simple holder by means of which a welding rod may be readily gripped by the operator in carrying out a welding job, the holder being so arranged that the operator's hand is a safe distance from the heat, and being also so arranged that the welding rod or stock may be fed by gravity.

Other objects and advantages will appear in the following specification reference being had to the accompanying drawing, in which Figure 1 is a perspective view of the improved welding rod holder, Figure 2 is a central longitudinal section thereof, Figure 3 is a cross section on the line 3—3 of Figure 2, Figure 4 is a cross section on the line 4—4 of Figure 2, Figure 5 is a cross section on the line 5—5 of Figure 2.

The herein described holder is intended to be used in connection with acetylene welding. The purpose of the holder is to provide means by which the operator may secure a firm grip on the welding rod and at the same time dispose his hand at a safe distance from the flame and thereby insure him protection from the heat. The welding rod is capable of being fed as much as desired at a time, and the holder is so designed that the welding rod may be used down to a very small end.

In carrying out the invention provision is made of a tubular shank 1 at the opposite ends of which the welding rod barrel 2 and handle 3 are situated. The barrel 2 is made integral with the shank 1. The barrel consists of a short section of tubing, the interior of which communicates with the interior of the shank 1. It is for the purpose of receiving the welding rod or stock W, and in order that the welding rod may be properly presented to the place where the weld is to be made the barrel 2 is fixed at an acute angle to the shank.

Operable in the tubular shank 1 is a latch rod 4 which is intended to press against the welding rod W and hold the latter in position in the barrel 2. A spring 5 situated between the base of the latch rod and a plug 6 in that end of the shank 1 contained by the handle 3 presses the rod 4 toward the barrel 2 so that the foregoing purpose may be accomplished. A ferrule 7 aids in holding the handle 3 in place upon the shank 1 and at the same time gives a finish to the holder at the place where the shank joins the handle.

Fastened to the latch rod 4 by means of rivets or other means 8 is a finger piece 9 by means of which the latch rod is moved backward toward the handle 3 in order to retract the latch rod from the barrel 2. The finger piece includes a lug 10 through which the rivets pass for the fastening of the finger piece upon the latch rod. This lug occupies and is slidable in a slot 11 in the tubular shank, and the presence of the lug in the slot prevents turning of the latch rod.

The operation.

It is often the custom of welders to weld together two sections of welding rods in order that one section may be used as a handle while the welding material is supplied by the other. These sections are joined at an obtuse angle so that the section which supplies the welding material may be held at a safe distance from the flame.

It is the purpose of the invention to avoid the waste of time occasioned by joining the two sections of welding material, as well as the gas which is consumed and also those portions of the material which are heedlessly discarded. A section or length of welding rod W is inserted in the tubular barrel 2 as shown by dot and dash lines in Figure 2, the latch rod 4 first being retracted by pressing backward on the finger piece 9. The operator holds the device in one hand by means of the handle 3 in order to do this. Upon release of the finger piece 9 the spring 5 returns the latch rod 4, causing the left extremity to grip the side of the welding rod and hold it in place. It is apparent that the hand of the operator which holds the welding rod is disposed at a safe distance from the welding flame.

Feeding of the welding rod W is accomplished by gravity. It is merely necessary to press backward upon the finger piece 9 in order to sufficiently release the latch rod 4 from the welding rod when the latter will gravitate the desired distance in the barrel ...ly manipulating the finger ...perator will find himself able to ...elding rod quite accurately. It ...ossible to use the welding rod down ...y short ends thereby reducing the ...nt to a decided minimum. In order ...t as much as possible of the welding rod ...ay be used the barrel 2 is affixed to the tubular shank 1 off center. The distance between the latch rod 4 and the lower end of the barrel 2 is therefore relatively short, and such ends of welding rod as must be discarded will be correspondingly short.

There is a purpose in locating the spring 5 in the handle 3 or in other words at the greatest possible distance from the barrel 2. The heat from the welding flame has a tendency to draw the temper of the spring. This would be a serious disadvantage in the holder if the spring 5 were situated anywhere near the slot. By locating the spring as remotely as possible from the welding point the danger of injuring the spring is correspondingly removed.

In welding it is quite essential that the welding rod be fed to the weld substantially at right angles to the hand. The barrel 2 is described as being situated at an obtuse angle to the shank 1. The actual angle of the barrel may be varied, but it should be at substantially right angles so that all parts of the weld may be readily reached and that the hand of the welder may be kept at a safe distance from the flame.

While the construction and arrangement of the improved welding rod holder is that of a generally preferred form, obviously modifications and changes may be made without departing from the spirit of the invention or the scope of the claims.

I claim:—

1. A holder for the purpose described comprising a tubular shank having a slot at one end, a tubular barrel affixed thereto at an angle at the opposite end and communicating with the interior, a latch rod occupying the shank and at one end entering the barrel, a spring pressing against the opposite end of the latch rod to grip a welding rod in said barrel, a handle on the slotted end of the shank having a plug against which the spring bears, said spring being housed both by the shank and handle for protection from the heat of the welding flame, and a finger piece having a lug by which it is affixed to the latch rod at said slot, said lug in the slot preventing turning of the latch rod.

2. A holder for the purpose described comprising a shank, a spring-latch rod operable in the shank and having a finger piece, a handle carried by the shank from which the finger piece may be operated, and a communicating barrel carried at an angle by the shank in which a welding rod is gripped by the spring-latch rod, said barrel being affixed off center to the shank so that the feed end is shortened thereby reducing the amount of possible waste of welding rods.

3. A welding rod holder comprising a shank, a latch rod contained by said shank, a communicating barrel affixed to the shank at one extremity at an angle, a handle into which the other extremity of the shank is fitted and into the limits of which the adjacent end of the latch extends, a spring abutted by said latch being located within the limits of the handle and remote from the barrel thereby protecting the spring from the heat of the welding flame, and a finger piece carried by the shank for retracting the shank against spring tension.

JOHN F. KELLY.